Oct. 20, 1953     E. L. WALTERS     2,655,765
METHOD AND APPARATUS FOR FORMING SHEET GLASS
Filed Nov. 6, 1947     4 Sheets-Sheet 1

Inventor
Emmett L. Walters
By Nobbe & Swope
Attorneys

Oct. 20, 1953            E. L. WALTERS            2,655,765

METHOD AND APPARATUS FOR FORMING SHEET GLASS

Filed Nov. 6, 1947                                      4 Sheets-Sheet 2

Inventor
Emmett L. Walters
By Nobbe & Swope
Attorneys

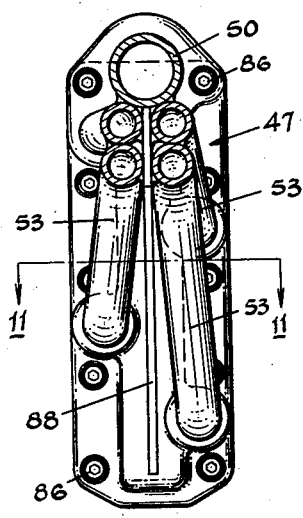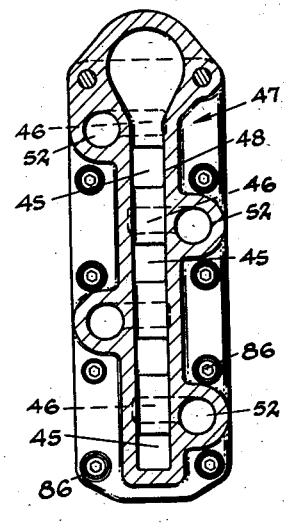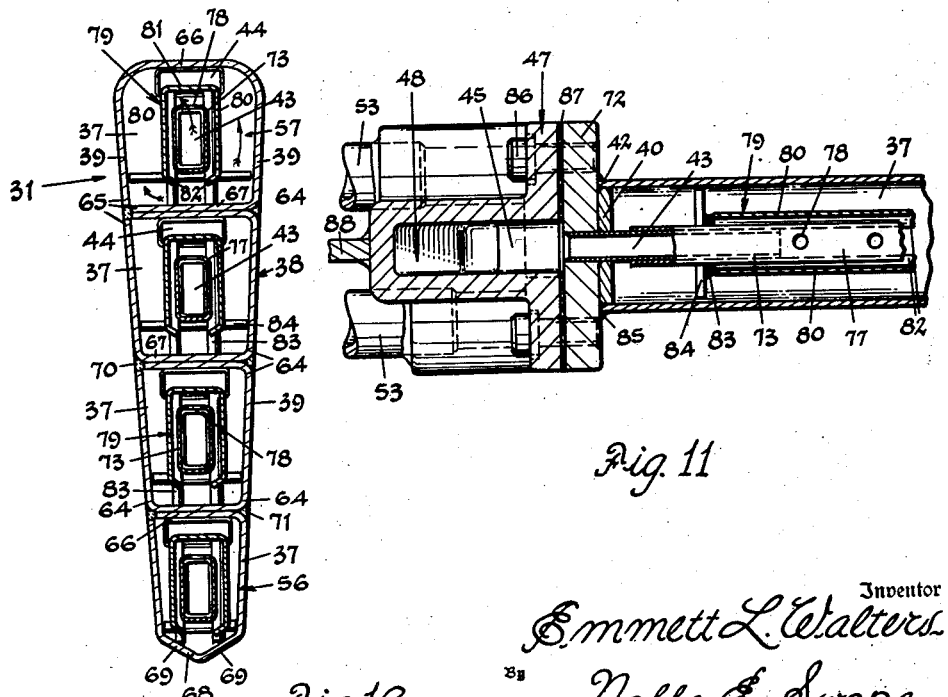

Oct. 20, 1953  E. L. WALTERS  2,655,765
METHOD AND APPARATUS FOR FORMING SHEET GLASS
Filed Nov. 6, 1947  4 Sheets-Sheet 4

Inventor
Emmett L. Walters
By Nobbe & Swope
Attorneys

Patented Oct. 20, 1953

2,655,765

UNITED STATES PATENT OFFICE 2,655,765

METHOD AND APPARATUS FOR FORMING SHEET GLASS

Emmett L. Walters, Toledo, Ohio, assignor to Libbey-Owens-Ford Glass Company, Toledo, Ohio, a corporation of Ohio Application November 6, 1947, Serial No. 784,409

2 Claims. (Cl. 49—17)

1

The present invention relates broadly to the production of sheet glass, and more particularly to an improved method and apparatus for controlling the temperature of the glass sheet and of the surrounding atmosphere while the sheet is being drawn from a mass of molten glass.

The primary purpose of the invention is to provide a novel method and apparatus for treating or conditioning the glass in a sheet being drawn, in a manner that will substantially reduce the waves, distortion and other defects that have heretofore come to be considered characteristic of flat drawn sheet or window glass, and that will permit sheets of given thicknesses to be continuously drawn from the molten bath at a higher speed than has heretofore been considered possible.

Briefly stated, the apparatus involved includes multicompartment heat exchangers or coolers, in which the cooling action exerted by each of the several compartments can be individually controlled, and which heat exchangers are positioned within the sheet forming zone of the drawing machine along and at opposite sides of the body of the sheet, and/or at opposite sides of the marginal portions of the sheet being drawn.

An important object of the invention is the provision of a novel method of accurately and uniformly cooling the sheet, and the surrounding atmosphere, along a plurality of transverse bands or areas extending across the entire width of the sheet as it moves through the forming zone, and at the same time accurately varying the degree of cooling exerted in adjoining transverse bands or areas.

Another object is to provide a method of cooling the edges of the sheet adjacent the base thereof, and of varying the degree of such cooling in the direction of the length of the sheet.

Another object is the provision of a novel method of maintaining the sheet to width by differential cooling of the margins thereof at adjoining areas adjacent the base of the sheet.

Another object is the provision, in sheet glass forming apparatus, of multicompartment coolers arranged within the sheet forming zone, and adjacent the sheet being formed, and of means for varying the cooling action exerted upon the sheet by different compartments of said coolers.

Another object is the provision in a sheet glass forming machine of coolers of the above character, and in which each of said compartments can be shifted relative to the other compartments to move them toward or away from the glass sheet.

2

Another object is to provide a novel form of multicompartment cooler having a cooling medium within each compartment, and means for independently controlling the temperature of the cooling medium in the several compartments.

Still another object is the provision in a cooler of the above character of means for circulating a fluid cooling medium through each compartment and of means for directing the flow of said medium to increase the efficiency of the cooling action thereof.

Other objects and advantages of the invention will become more apparent during the course of the following description, when taken in connection with the accompanying drawings.

In the drawings, wherein like numerals are employed to designate like parts throughout the same:

Fig. 9 is an end elevational view of the manifold end plate utilized in both forms of coolers;

Fig. 10 is a cross sectional view, taken on the plane of the line 10—10 in Fig. 2, showing the passageways in the manifold plate for feed and exhaust of the coolant medium;

Fig. 11 is a fragmentary section taken on the plane of the line 11—11 in Fig. 9;

Fig. 12 is an enlarged vertical sectional view through one of the sheet coolers shown in Fig. 1;

Figure 1:
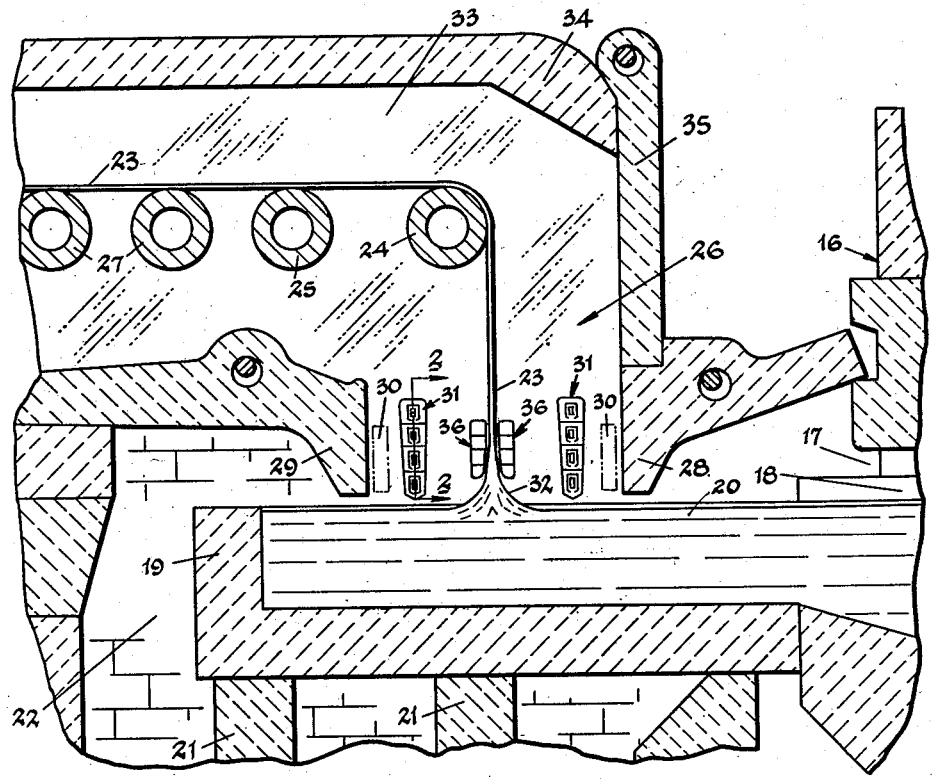
Fig. 1 is a longitudinal vertical sectional view of a sheet glass drawing machine, showing associated therewith the multicompartment coolers constructed and positioned in accordance with the present invention.

The method and apparatus of this invention can be used in conjunction with any of the well known sheet glass drawing machines. In all of them a continuous ribbon is drawn from a mass of molten glass contained in a working receptacle that is supplied from a tank furnace. The Colburn type machine shown in the drawings is illustrative of the general type and presents the characteristic problems of air and temperature control.

Thus, with reference to the drawings and particularly to Fig. 1, the drawing of sheet glass, in accordance with the Colburn process, is performed in a drawing machine associated with a continuous tank furnace, generally indicated at 16, having an outlet end 17 of conventional construction. Properly conditioned molten glass flows from the furnace, through a cooling chamber 18, into a relatively shallow working receptacle, or draw pot 19, to form a relatively shallow bath of glass 20. The draw pot 19 is supported on stools 21 within the heating chamber 22 which surrounds the draw pot and is heated in any desired manner.

A sheet of glass 23 is continuously drawn upwardly from the surface of the molten bath 20 and while still in a semi-plastic condition, although substantially set in its final sheet form, is deflected into the horizontal plane about a bending roll 24 and then passed over a so-called idler or intermediate roll 25 and through a drawing and flattening chamber 26 wherein the said sheet is then supported and carried forwardly toward a suitable annealing leer (not shown) upon a series of horizontally aligned machine rolls 27.

The standard Colburn machine includes the lip-tiles 28 and 29 and lip-tile coolers or heat exchangers 30 shown in phantom in Fig. 1. These lip-tiles and coolers are positioned to protect the rising sheet 23 from blasts of hot air and gases from the pot chamber and furnace, and the coolers also serve to reduce the temperature of the surface of the glass moving thereunder, just before it is pulled into the sheet.

That area of the drawing chamber 26 that is disposed generally below the bending roll 24 and between the lip-tiles is the area referred to herein as the forming zone, and within this zone is the exposed surface of the molten glass in the draw pot and the sheet 23 being formed. As this sheet or ribbon of glass is drawn upwardly, a meniscus or enlarged base portion 32 is first created, and this meniscus pulls progressively thinner and thinner as it moves upward until the sheet becomes substantially set some distance above the molten bath, the glass sheet by this time having lost sufficient plasticity to attain its final thickness.

The thickness of a finished sheet that has been drawn from a bath of molten glass in this, or any of the other conventional machines, is dependent chiefly upon the viscosity of the glass during the formative period and the speed at which the sheet is drawn. Since the viscosity of the glass is determined by its temperature it will be apparent that when the temperatures in the forming zone are not constant, sheets that vary correspondingly in thickness will result. Similarly, differences in temperature across the sheet in the forming zone or uncontrolled air currents in the atmosphere surrounding the sheet, produce alternate thick and thin streaks, distortion and waves in the finished sheet. This is because in areas where relatively cool air strikes the unset glass, it will chill or set up more rapidly and so will be thicker at this point. On the other hand areas that are subjected to excessively heated air will continue to attenuate and grow thinner beyond the normal setting-up point.

Considerable difficulty has been experienced in attempting to maintain atmospheric conditions and temperatures within the forming zone of the conventional sheet glass drawing machines sufficiently constant and uniform to produce glass sheets having the necessary constant average thickness, the necessary uniformity of thickness from edge to edge, and whose surfaces are sufficiently free from imperfections to meet present day requirements for commercial glass quality.

Primarily this is because the conditions naturally existing in this area or zone are definitely opposed to such a balanced state.

In the first place, the sheet or ribbon, as it is drawn vertically from the molten bath, is exposed on each surface to rising hot air currents and to cross currents of cooler air merging into the hotter currents from exterior portions of the furnace. A normal range of atmospheric temperature above the mass of molten glass is of course high but not uniform, either across the forming sheet or across its base or line of formation. Instead, the stack effect produced by the ambient air currents carries the hot air up along the central portions of the rising sheet and, at the same time, acts to draw relatively cooler air inwardly from beyond the sheet edges.

The draughts of cooler air moving toward the centralized zone of rising hot air gradually becomes influenced and in warming expands to produce cross currents of varying temperature that flow outwardly past the sheet edges until they finally joint the rising stream of hot air along the path of the moving sheet. The continually changing zones of atmospheric temperature, as induced by the cross currents of air, together with the natural convection currents set up along the surfaces of the hot sheet, normally produce a turbulence which seriously interferes with the maintenance of uniform temperatures.

Attempts have already been made to overcome these adverse air conditions by enclosing the drawing chambers of the machines as completely as possible as indicated at 33, 34 and 35 in the drawings. This is good practice and does reduce the uncontrolled air movements by shutting out a substantial amount of the relatively cold outside air. However, there is always a considerable infiltration of air through the enclosure in spite of all precautions, and this not only results in the air movements discussed above but also brings in dust and other particles which may embed themselves in the soft glass to cause permanent surface defects, or may lodge upon rolls with which the sheet comes in contact and cause scratching, digs, and so forth.

According to my invention, special temperature control and temperature modifying mediums are disposed adjacent the rising glass sheet so as to modulate the temperature of the normally rising air currents and so create a substantially established, atmospherically tempered zone or zones through which the sheet must pass during the most critical period of its formation when the glass is viscous or has not become set in a semiplastic condition. Such zones are defined by setting up heat absorption or radiant stratas, bands or areas extending across the surfaces of the semiplastic sheet and providing, by the novel construction and control of the cooling devices, a means for effecting a differential of heat absorption in one portion of the devices as distinct from the adjoining portions.

Moreover, the method of controlling the rate of heat absorption is adapted to establish a more rapidly set area adjacent the edges of the glass sheet to maintain the desired width.

Specifically, I accomplish these results by employing the multicompartment, adjustable sheet or lip-tile coolers or heat exchangers 31; and the multicompartment, adjustable width maintaining coolers 36, shown in Fig. 1. These special multicompartment heat exchangers may be used to replace the conventional type lip-tile coolers previously used or they may be employed in combination therewith in the manner indicated in Fig. 1.

As has already been pointed out, each of these coolers is made up of a plurality of compartments arranged one above the other, with the temperature of each compartment being individually controlled so that the rising sheet and the atmosphere surrounding it can be uniformly cooled along transverse bands or areas extending entirely across the width of the sheet while at the same time the temperature within each transverse band or area can be varied from that of the adjoining bands or areas.

For best results under average conditions I prefer to position the several coolers substantially as illustrated in the drawings. However, in some instances, a shift of location may be found to be advantageous, and may be necessary to compensate for particular glass temperature, thickness of sheet desired, etc.

To illustrate, each of the lip-tiles or sheet coolers, indicated generally at 31, has a plurality of superimposed compartments 37. These compartments are assembled so as to have substantially planular surfaces or outer walls 38. The unitary structure of the cooler may be adjustably supported in any conventional or preferred manner of construction (not shown) so that the cooler 31 may be shifted either vertically or transversely within the drawing chamber 26 and above the draw pot 19.

Figure 2:
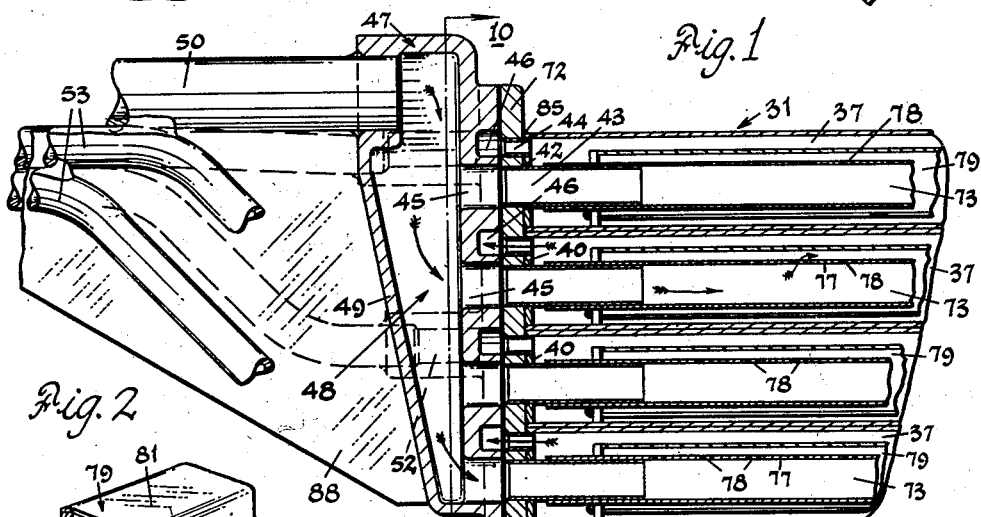
Fig. 2 is a fragmentary sectional view on enlarged scale taken substantially along the line 2—2 in Fig. 1.
Figure 3:
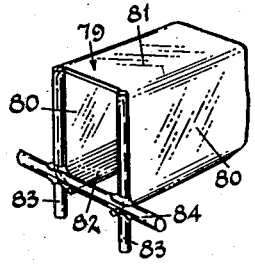
Fig. 3 is a fragmentary, end perspective view of a cooler baffle showing the means for spacing the baffle from the walls of the cooler compartment.
Figure 4:
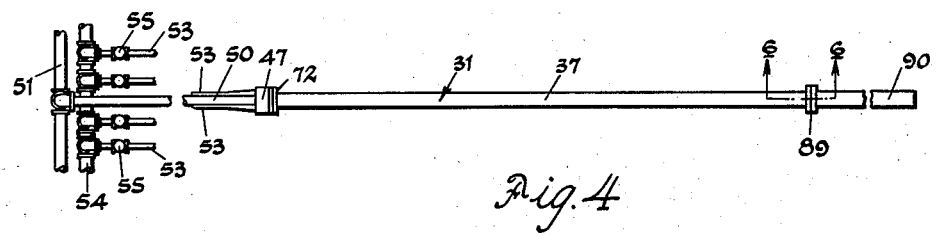
Fig. 4 is a plan view of a sheet cooler assembly with parts broken away.

As particularly shown in Fig. 12, the compartments 37 are substantially rectangular in form, though, and as illustrated, the individual vertical walls 39 are disposed at a slight angle so that the unit, in its entirety, assumes an outline that is somewhat of a wedge shape. The ends of the compartments are closed by plates 40 and 41, by welding, as shown at 42, Figs. 2, 6 and 11, the end plates 40 being apertured for insertion of conduit pipes 43 and 44. The pipes 43 and 44 communicate with ports or passageways 45 and 46 in a manifold 47 to introduce a fresh supply of a suitable temperature control medium or coolant, such as water or air, into each of the compartments and to receive the medium as it moves along and gradually absorbs heat from contact with the walls 39. Referring to Fig. 2, it will be seen that the passageway 45 opens into a main supply vent 48 extending lengthwise of the manifold 47 and having a diminishing cross sectional area afforded by the diagonally disposed end wall 49. The supply vent or well 48 communicates with a feed pipe 50, the end of which is located in and welded to the upper end of the manifold. The feed pipe 50 is connected to a suitable source of fluid supply (not shown) by a main pipe 51 (Fig. 4).

The exhausting coolant, emerging through the conduits 44 and ports 46, is directed from the compartments 37 into exhaust ports 52 which communicate with pipes 53, connected to main return pipe 54. The rate of flow of the coolant from the cooler 31 is controlled and separately modified by hand valves 55 interposed in the pipes 53. The cooling effect may thus be modulated by the rate of heat loss in any one of the compartments with a resultant influence upon the rising air currents within the furnace. The desired control over the temperature of the zone through which the sheet glass is passing may therefore be exerted by reducing or increasing the rate of exhaustion of the heated fluid from the compartments. Accordingly, the flow of coolant through the lower compartment 56 may be accelerated as compared with the coolant flow in the top compartment 57 and the rate of flow in the intermediate compartments can be adjusted so that from bottom to the top a graded rate of absorption will be effected. Obviously then, if conditions within the furnace, or the rate of draught of the glass sheet, necessitate a primary or lower zone of higher temperature, the flow from the lower compartment 56 of the cooler 31 may be materially reduced, while in the upper compartments the flow may be accelerated so that a sharp fall in temperature will be produced in the areas adjacent the upper compartments. The conditioning effect of the rising air currents upon and across the surfaces of the glass sheet is therefore directly controllable and the creation of irregular setting areas will be greatly obviated.

As the sheet of glass 23 rises from the molten bath 20, there is also a natural tendency to diminish in width by a continual tapering of the expanse of the sheet. To offset this undesired effect, which would eventually terminate the forming ribbon or sheet of glass, many devices, now conventional in practice, have been developed to engage or surround the outer portions of the sheet 23 and, by means of their formation or rolling contact, hold the edge 58 from shrinking toward the central portion of the sheet with a gradual loss of width. In the majority of instances, these devices have slotted portions located in the path of the rising sheet so that the outer edges must pass therethrough, or they are provided in the form of cooled knurled rollers that actively grip the outer portions to maintain the desired width subsequent to the rolling engagement.

Figure 5:
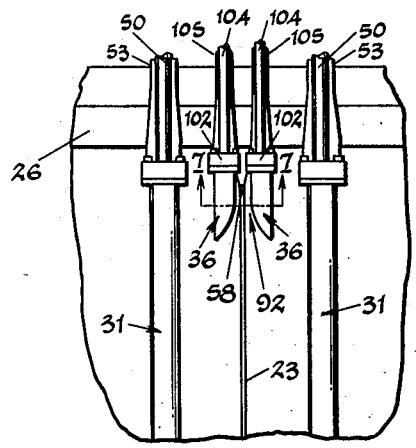
Fig. 5 is a plan view of a portion of the draw pot showing the relative locations of the multicompartment coolers with reference to the sheet of glass.
Figure 7:
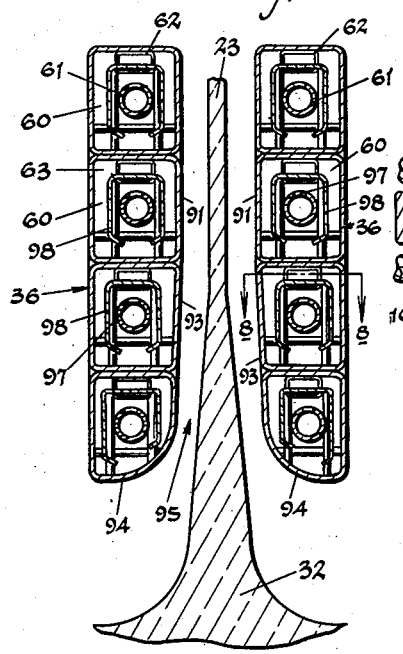
Fig. 7 is a sectional view of the width maintaining coolers, taken substantially on the plane of the line 7—7 in Fig. 5.

Heretofore, however, the devices have not been provided with a controlled temperature gradient so that modifications could quickly be made to vary the cooling influence according to existent conditions along the length of the sheet. The edge coolers 36, as shown particularly in Figs. 5 and 7, are positioned relative to the sheet 23 of glass that the radiant cooling influence of their adjacent surfaces may be directed against the outer edge portions as the sheet assumes the desired final thickness.

Each of the coolers 36 is generally similar in construction to the coolers 31 already described, and acts to cool opposite marginal portions of the rising sheet along a similar series of transverse bands. Thus, the coolers 36 comprise a series of superimposed compartments 60 having conduits 61 and 62 that are supported by welding in a plate 63 which closes the end of each compartment. The conduits 61 and 62 are connected by suitable piping to a source of fluid temperature control medium or coolant which supplies the fluid at the desired temperature. The flow of the coolant through the various compartments 60 of the coolers will effect an accelerated setting of the glass composing the edges 58, and the rising sheet 23 will continue from the area of the coolers 36 with a minimum of diminution in over-all width.

Referring now to either form of cooler, 31 or 36, and to set forth in similarity the method of their fabrication, attention is directed to Fig. 12 wherein the compartments, typical of either compartment 37 or 60, will be seen to have corner portions 64, provided by bending of the sheet metal of which the compartment is formed. The ends 65 of the sheet metal are located in proximity to complete the substantially rectangular formation and are secured by welding. Preferably, the compartments are so bent as to have top and bottom wall portions 66 and 67, respectively, and side walls 39 which provide in assembly the outer walls 38 of the unit coolers. In the sheet or lip-tile cooler of Fig. 12, the lowermost compartment 56 is provided with an upper wall portion 66 while the lower portion 68 has converging, sloped sides 69 shaped to close the cooler in a wide point.

This construction of bottom wall in the coolers 31 will result in the uniform cooling of the surface of the mass of molten glass as it moves toward the sheet source along a narrow transverse line.

In the fabrication of the coolers 31 or 36, the compartments are assembled one upon another and are so located that welding, as at 70, will not only close the ends 65 of each compartment, but will also secure one compartment to the adjoining one, both above and below. Preferably, a seam of weld is made, as at 71, in the opposite corner 64 to unite the compartments into one integral structure. Preliminary to affixing the thus assembled compartments to a mounting plate 72 to complete the unit, suitably formed metal members are inserted into each of the compartments to cause a general distribution of the coolant throughout the compartment and a likewise general or equalized passage of the coolant toward the walls 39.

Figure 6:
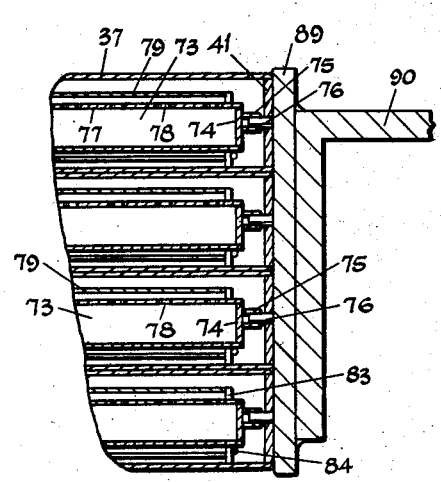
Fig. 6 is an enlarged fragmentary section taken on the plane of the line 6—6, as indicated in Fig. 4, and illustrates one manner of support for the end of the cooler opposite the feed and exhaust end shown in Fig. 2.

The inlet or feed conduit 43 is extended through the end plate 40 and secured therein. A distributor pipe 73 is fitted to the conduit 43. The pipe may be obtained from commercially formed rectangular tubing. As shown in Fig. 6, the remote end of each pipe 73 is closed by a cap plate 74 which is provided with a collar 75 to receive a locator plug 76. The plug 76 is suitably attached to the end plate 41 so that the distributor pipe 73 will be easily and accurately located through the central portion of each compartment. The upper wall 77 of the pipe 73 is provided with regularly spaced openings 78 through which the coolant flows, the size and spacing of the openings being arranged to cause a substantially equal rate of flow at any point along the extent of the pipe. The coolant, when introduced into the compartment from the pipe, is further confined in its movement by a restriction which surrounds the pipe 73. The restriction produces a regularly gradual assimilation of heat from the walls 38 of the cooler since by its configuration the movement of the coolant is directed toward the lower wall 67 of each compartment from which it is dispersed toward either of the outer walls.

The restriction is afforded by a U-shape baffle member 79 which is inverted so that the leg portions 80 depend from the web portion 81 along the sides of the distribution pipe 73 and terminate in diagonally convergent flanges 82. The baffle member is maintained in spaced relation from the bottom wall 67 and the side walls 39 in each compartment by supporting legs 83 and rods 84. In view of the length of the cooler 31, the legs and spacer rods may be located at equally spaced distances along the baffle member to assure its position and definite relation with reference to the walls of the compartment and the pipe 73. As shown in Fig. 12, the surfaces of baffle member will induce a downward flow of the coolant with a subsequent rising flow as it moves along the wall portions 39. The incoming fresh coolant from the conduit 43 will progressively thus pass from the pipe 73, through the baffle member 79 and along the walls of the compartments until it is exhausted therefrom through the conduit 44. The conduit 44 is preferably located in an upper area of the end plate 40 so that, when the pipe 73 and baffle 79 have been assembled in the compartment, the passageway thus afforded will exhaust the rising or heated portion of the coolant.

The exposed ends of the conduits 43 and 44, when the end plate has been secured in the end of the compartments, are extended into matching openings provided in the mounting plate 72. The conduits are then welded in place and the assembled unit of the cooler welded to the opposite face of the mounting plate, as shown at 85.

The mounting plate 72 and manifold 47 are secured together by bolts 86 and, if desired, a gasket 87 may be interposed to effect a tight seal between their surfaces. The conduits 43 will then register with the apertures 45 communicating with the supply vent 48, while the conduits 44 register with the passageways 46. The supply vent 48 is fed at its upper end from the pipe 50 and, as previously described, has a progressively reduced cross sectional area so that each of the apertures will receive a proportionate amount of the coolant as required by its movement through the compartments. The exhaust ports 52, as shown particularly in Fig. 10, are alternately arranged on the opposite sides of the vent 48 so that the exhaust transmission pipes 53 may be suitably disposed with respect to the feed pipe 50 and with it, secured in a compact assembly which will serve as a support, at one end, for the cooler. To reinforce the support assembly, a web plate 88 is located and secured between and to the pipes 53 and also to the wall 49 of the manifold 47.

The opposite end of the cooler, which is closed by the end plates 41 of the individual compartments 37, is secured by welding to a mounting plate 89. For purposes of illustration, an arm 90 is extended from the plate 89 to support the cooler on the opposite side of the drawing chamber 26, though it is apparent that the form is conventional and may be altered to accommodate specific installations.

Thus, as coolant is pumped into the feed pipe 50 and therefrom, through the manifold 47, to the several compartments 37, it will progressively move toward and along the walls 39 to absorb the incidental heat and by this assimilation to vary the temperature of the atmosphere in the vicinity of the rising glass sheet 23. However, as it moves toward the conduit 44 to be removed to the pipes 53, its rate of flow will be controlled by adjustment of the hand valves 55 and the rate of heat absorption may be thus determined so that the rising hot air currents may be influenced by one or another of the compartment walls 39 which comprise the surfaces 38 of the cooler. An accelerated rate of flow through the lower compartment 56 or a reduced rate of flow will produce a pronounced effect upon the rising air currents in the primary area to be controlled, and, through similar adjustment of the valves, the upper compartments will promote the creation of a gradually cooler transverse band or area or of a series of areas in which the rising air currents will be beneficially affected upon and across the expanse of the surfaces of the sheet of glass 23.

Figure 8:
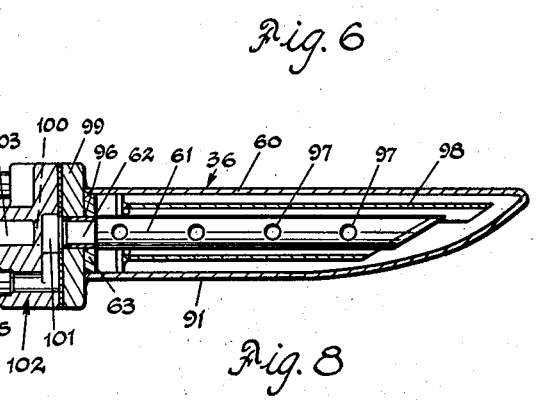
Fig. 8 is a sectional view of one of the width maintaining coolers taken on the plane of the line 8—8 in Fig. 7.

As shown in Figs. 7 and 8, the construction of the distributor pipe and baffle member is modified to correspond to the shape or outer contour of the form of cooler employed for maintaining width of the sheet as it forms. The facing surfaces 91 of the coolers 36 are curved to flare outwardly to present a walled groove 92 through which the edge 58 of the sheet 23 passes. The affected area of the setting glass will thus be acted upon in a diminishing degree of chill so as to concentrate the desired chill along the edge and thereby strengthen the glass by hastening its transmission from a viscous to a semiplastic condition.

The formation of the compartments 60 comprising the upper portion of each cooler may be substantially rectangular while the lower compartments may be formed to present a sloping wall portion 93 and curved portion 94. In a completed assembly, and as installed, the coolers will form, not only a groove 92 but a vertically extending wedge shaped passage 95. The edge of the continuously moving sheet will thus be conditioned in a gradually narrowing area in order that the effect of the cooling influence will neither react too abruptly on the glass along the edge portion, nor project the influence of the chill beyond a desired marginal limit.

The compartments 60 of the coolers 36 are closed by the plate 63 through and in which the conduits 61 and 62 are extended and secured as indicated at 96. In view of the relative shortness of body, the conduit 61 is projected sufficiently into the compartment to permit the formation of openings 97. The projection of the conduit 61 is surrounded by a baffle member 98 to insure a regulated flow of the coolant between the baffle and the walls of the cooler. The ends of the conduits extended oppositely from the plate 96 are located and secured in a mounting plate 99 by welding as heretofore described and register with ports or passageways 100 and 101 of the manifold 102. The passageway 100 communicates, through a supply vent 103, with the feed pipe 104 which receives the coolant at the desired temperature to properly condition the glass in the sheet edges. The rate of heat absorption between the walls 91 of the coolers will thus materially increase the rate at which the plastic glass sets while the effectiveness of the individual compartments in producing the desired cooling may be controlled by alteration of the exhausting flow rate of the coolant through the conduit 62, the passageways 101 and the transmission pipes 105.

Figure 13:
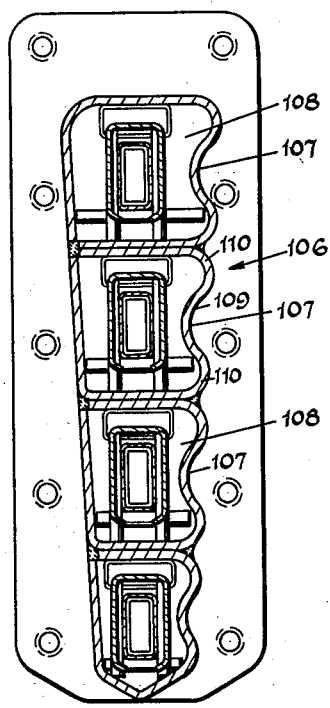
Fig. 13 is a cross sectional view similar to Fig. 12 but showing wherein a modified form of wall involving curvilinear surfaces adapted to amplify the effective cooling areas.

In the form of construction illustrated in Fig. 13, the sheet cooler 106 is provided with modified walls 107 in each of the compartments 108. The walls 107, located on the side of each cooler facing the glass sheet, have an increased surface area by reason of their arcuate contour to afford a greater expanse of heat absorbing surface. It may be found under certain operating conditions that there is an advantage in amplifying the effective area of one or several of the compartments thereby gaining a wider range of influence on the rising air currents and inducing a more rapid rate of heat absorption. As shown in the figure, the walls 107 have a centrally formed concave portion 109 merging into the corner bends 110; however, while a single curved surface is produced by the portion 109, a variety of contours or convolutions may be developed to obtain a desired expanse of surface without departure from the spirit of the invention.

Figure 14:
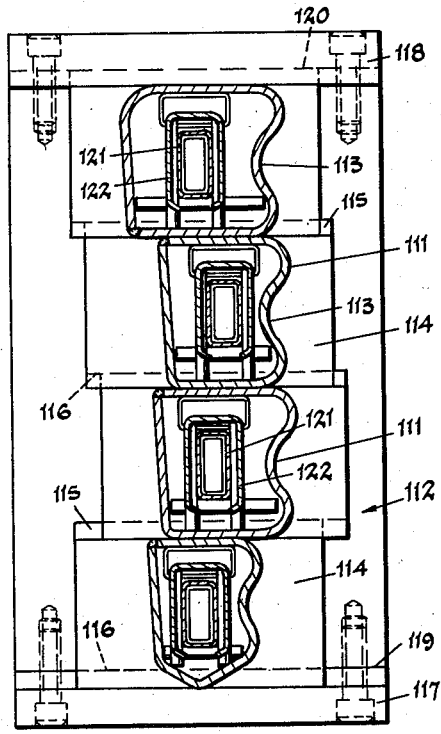
Fig. 14 is a similar view of a further modification wherein compartments of a form shown in Fig. 13 are mounted for individual movement within a unitary support frame.

In order to further increase the individual control characteristics of each compartment of either of the sheet coolers, the compartments may be constructed as illustrated in Fig. 14 wherein the cooler compartments 111 are mounted in a frame 112 so that one may be shifted relative to either of its neighboring compartments. Such an arrangement makes possible the projection of one or more surfaces, such as the surfaces of the walls 113, into the path of the rising air currents with a resulting procurement of a better means of control. Referring to the positions of the compartments 111, it will be seen that the second from the top is shifted in a direction toward the area in which the sheet of glass is moving while the next adjacent compartment has been projected outward still farther. In utilizing the embodiments of my invention in such constructions, it is possible to produce, in each compartment, a controlled coolant flow as well as a heat absorbing wall of plane or curved surface and of greater or less expanse thereby obtaining a maximum degree of regulation in cooling of the air currents rising in the vicinity of each side of a forming glass sheet.

By means of such forms of interrelation as the tongue and groove construction shown in Fig. 14, it is possible to maintain each of the compartments 111 in a definite relation with reference to its adjoining compartment. Thus, the end plate 114 of each compartment has a tongue 115 formed on its upper surface which interfits with a complementary groove 116 in the lower surface of the end plate of the next compartment. In completing the assembly of the compartments in the frame 112, a base plate 117 is secured to the bottom of the frame while a cap plate 118 is secured to the top of the frame. The base plate 117 is provided with a tongue 119 for receiving the groove 116 of the bottom compartment's end plate 114 and a groove 120 is formed in the cap plate 118 to receive the tongue 115 of the end plate 114 of the upper compartment. The plates 117 and 118 accordingly will maintain the compartments in alignment with each other while permitting, within the area of the frame 112, any desirable shifting to establish the most influential rate of heat absorption. The compartments are provided, as previously described in connection with the compartments 37, with distributor pipes 121 and baffles 122 which afford a controlled directional coolant flow from a similar source.

Figure 15:
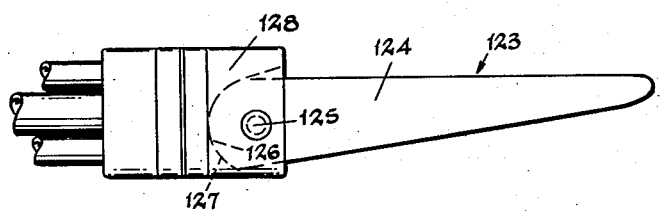
Fig. 15 is a view of a modified form of width maintaining cooler for permitting individual, radial movements of the compartments comprising the cooler.

The modified form of cooler 123, shown in Fig. 15, provides a capacity of movement for width maintaining coolers in order that the surfaces of the cooler compartment walls can be moved into or away from the immediate area of the sheet edge. In the top view of such a modified form, the compartment 124, is pivotally mounted on a pin 125 and has an end arcuate surface 126 bearing against a like surface 127 formed in supporting manifold 128. In a similar manner, each of the other compartments may be mounted so that collectively, or individually, they may be shifted radially to permit a more intimate spacing of the facing surfaces or a widening of the intervening space so that the effectiveness of the chill can be brought to a still more efficient and critical method of operation.

It is to be understood that the forms of the invention herewith shown and described, are to be taken as illustrative embodiments only of the same, and that various changes in the shape, size and arrangement of parts may be resorted to without departing from the spirit of the invention or the scope of the subjoined claims.

I claim:

1. In sheet glass drawing apparatus including a working receptacle for a bath of molten glass and means for drawing a sheet from said bath, heat exchangers arranged at opposite sides of said sheet and in spaced relation thereto and other heat exchangers arranged along the margins of the sheet and between said first-mentioned heat exchangers and said sheet, each of said heat exchangers comprising a plurality of compartments arranged one above the other, means for introducing a temperature control medium into each of said compartments to provide heat exchange between each of said compartments and the glass sheet, and flow control means for said medium for independently controlling the amount of heat exchange between each compartment and the glass sheet.

2. A method of producing sheet glass comprising, drawing a continuous sheet of glass from a mass of molten glass, positively radiantly cooling the opposite faces of said sheet and the atmosphere surrounding the same along one series of transverse hollow compartments, simultaneously positively radiantly cooling the edges of said sheet and the atmosphere surrounding the same along another series of transverse hollow compartments by introducing a cooling medium into both series of said compartments, and exerting a different degree of radiant cooling in adjacent compartments to compensate for varying atmospheric conditions surrounding said sheet by controlling the removal of said cooling medium from both series of said compartments.

EMMETT L. WALTERS.

References Cited in the file of this patent

UNITED STATES PATENTS

| Number | Name | Date |
|---|---|---|
| 966,652 | Colburn | Aug. 9, 1910 |
| 1,248,809 | Colburn | Dec. 4, 1917 |
| 1,550,428 | Corl | Aug. 18, 1925 |
| 1,551,029 | Hanson | Aug. 25, 1925 |
| 1,554,994 | Ferngren | Sept. 29, 1925 |
| 1,681,258 | Rowley | Aug. 21, 1928 |
| 1,688,530 | Drake | Oct. 23, 1928 |
| 1,701,170 | Allen | Feb. 5, 1929 |
| 1,702,501 | Dognaux | Feb. 19, 1929 |
| 1,731,278 | Snodgrass | Oct. 15, 1929 |
| 1,759,227 | Drake | May 20, 1930 |
| 1,761,763 | Wildermuch | June 3, 1930 |
| 1,798,136 | Barker | Mar. 31, 1931 |
| 1,841,548 | Nobbe | Jan. 19, 1932 |
| 1,841,660 | Mambourg | Jan. 19, 1932 |
| 1,979,571 | Pedersen | Nov. 6, 1934 |
| 2,104,460 | Halbach | Jan. 4, 1938 |
| 2,158,669 | Amsler | May 16, 1939 |
| 2,201,286 | Bundy | May 21, 1940 |
| 2,352,539 | Halbach et al. | June 27, 1944 |

FOREIGN PATENTS

| Number | Country | Date |
|---|---|---|
| 61,764 | Norway | Feb. 15, 1938 |
| 589,950 | Great Britain | July 3, 1947 |